Dec. 19, 1950 D. SEBASTIAN ET AL 2,534,381
HYDRAULIC BRAKE LEVEL INDICATOR
Filed Nov. 10, 1948
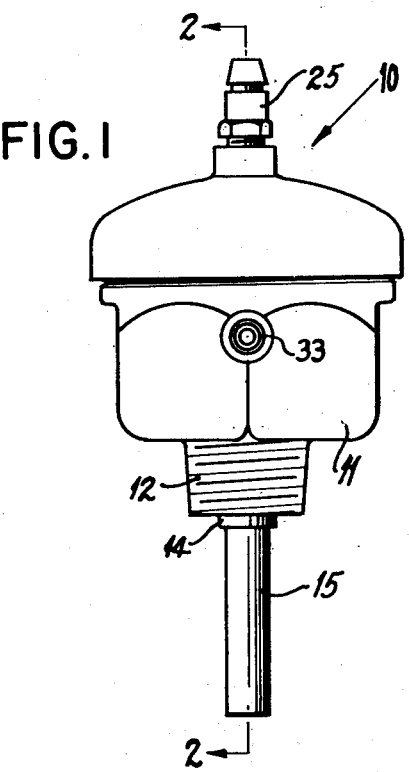
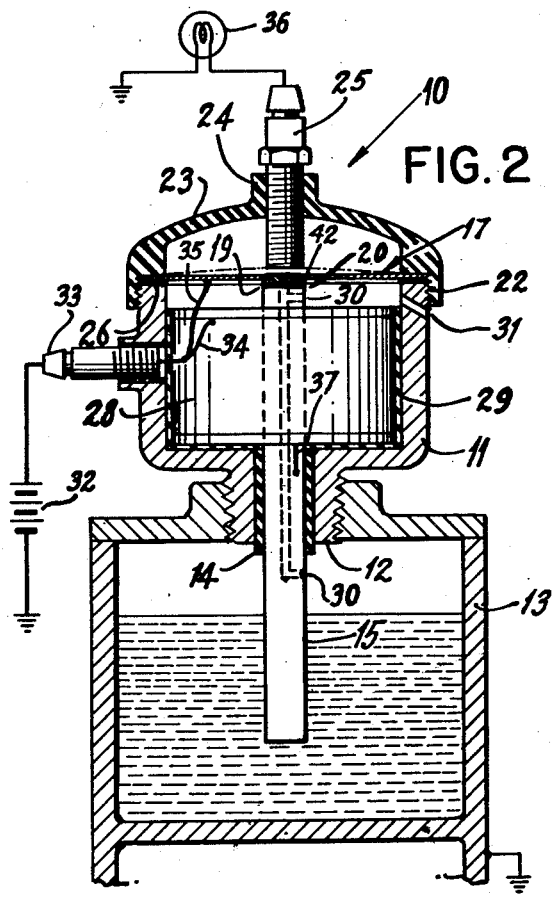
DAVID SEBASTIAN
ROBERT H. HAMPTON
BERNT J. HEGGEN
INVENTORS
By Joseph Blacker
ATTORNEY Patented Dec. 19, 1950

2,534,381

UNITED STATES PATENT OFFICE 2,534,381

HYDRAULIC BRAKE LEVEL INDICATOR

David Sebastian, Robert H. Hampton, and Bernt J. Heggen, Kings County, N. Y.

Application November 10, 1948, Serial No. 59,394

1 Claim. (Cl. 177—311)

This invention relates to an electric liquid level indicator for hydraulic brakes arranged to give a warning when the level of the liquid used for operating the hydraulic brakes drops below a danger point. An electric light or an electric bell may be used to show the danger point of the level of the liquid.

An object of this invention is to provide a self-contained plug which is designed to be inserted in the master cylinder in which the brake operating liquid is to be maintained at a set level, the plug having an electrode insertable in the container for the liquid with the lower surface thereof immersed in the liquid, the plug body having a diaphragm and an electric contact centrally thereof, and to provide means for energizing the electromagnet, the device being arranged so that when the level of the liquid is sufficient the diaphragm contact is on an electromagnet, thereby breaking the light or bell circuit.

Another object of this invention is to make the diaphragm of resilient metal and constructed so that it will due to its inherent resiliency rise into contact with an adjustable member in circuit with a grounded electric light or bell and so that when the level of the liquid is below the electrode, the electromagnet circuit is broken and the light or bell circuit is closed causing the light or bell signal to give warning of the low oil condition.

With the above and other objects in view, the invention will be hereinafter more particularly described, and the combination and arrangement of parts will be shown in the accompanying drawings and pointed out in the claim which forms part of this specification.

Reference will now be had to the drawings, wherein like numerals of reference designate corresponding parts throughout the several views, in which:

Figure 1 is a front elevation of the electric plug.

Figure 2 is a central cross-sectional view, the section being taken on line 2—2 in Figure 1 and showing the electric plug mounted in a master cylinder of a hydraulic brake.

Figure 3 is a top plan view of the plug body with the cover removed, and without the master cylinder shown in Figure 2.

In the illustrated embodiment of the invention, the numeral 10 indicates a self-contained electric signal operating plug comprising a casing 11 having a centrally apertured threaded lower end portion 12 for securing to a master cylinder 13 in which hydraulic brake operating liquid is to be maintained at a set level.

Secured in the threaded portion 12 is a sleeve 14 made of insulating material and an electrode 15 of a length to extend into the master cylinder 13 and be immersed at its lower end in the liquid therein.

The lower surface of the electrode 15 is raised above the lower surface of the master cylinder 13. A skeleton disk-shaped resilient diaphragm 17 is mounted on the upper surface of the casing 11. The diaphragm 17 has a plurality of radial arms 18, at the junction of which is a contact 19 which faces the upper end portion 20 of the electrode 15. The contact 19 is normally in contacting relation with the electrode 15.

Secured to the casing 11 by a thread 22 is a plastic cover 23 having a threaded boss 24 centrally thereof. Mounted in the boss 24 is a threaded adjusting member 25, the lower end of which is normally out of contact with the diaphragm 17. The diaphragm is insulated from the casing 11 by an annular washer 26 made of insulating material and placed between the diaphragm and the casing.

An electromagnet 28 is mounted in concealed relation in the casing 11 in circumscribing relation with the upper portion of the electrode 15 and insulated from the casing by suitable insulating material 29.

When the user fills the liquid above the danger level and the electrode is immersed in the liquid, the electromagnet becomes energized, thereby moving the armature contact to the electromagnet and breaking the circuit to a signal lamp or to the electric bell.

The drawing shows the liquid at the safe full level. The armature contact is on the electrode and has broken the circuit to the signal lamp or to the electric bell.

An air vent 30 is in the electrode 15 and communicates with the atmosphere through a passage 31 in the casing 11. The air vent allows air to pass through the casing into the master cylinder 13 as the liquid is drawn out therefrom.

In operation, when the level of the liquid drops below the electrode 15, the current flow through the electrode is stopped. This demagnetizes the electromagnet and releases the diaphragm. The diaphragm contact moves up and contacts the adjusting member. The current is now flowing through the signal light or electric bell.

The function of the concealed diaphragm and contact member and concealed electromagnet is to prevent exposure of these parts to inclement weather conditions.

It is to be noted that the resilient diaphragm is constructed so as to rise into contact with the adjusting member 25 unless pulled down by the electromagnet 28 when magnetized.

As shown in Figure 2, it will be seen that a grounded battery 32 is connected to contact terminal 33. From the terminal 33 is a connecting wire 34 suitably connected to the electromagnet 28 and a connecting wire 35 suitably connected to the diaphragm or armature 17. It will also be seen that a grounded electric light 36 is connected to the adjusting member 25 and that current from the battery 32 passes through the connecting wire 35, through the diaphragm armature 17, contact 19 and through the adjusting member 25 to the electric light 36 when the liquid level drops below the electrode 15.

When the liquid level is as shown in the drawing, the current from the battery 32 passes through the connecting wire 34, through the electromagnet 28, through a connecting wire 37 from the electromagnet to the electrode 15, and through the liquid in the grounded master cylinder 13.

It is to be noted that while we have shown the electromagnet housed in a self-contained plug, that we may mount the electromagnet and armature on the dashboard of a vehicle to which the apparatus herewith disclosed is particularly adapted.

It is to be noted that a thin layer of insulation means 42 will be placed on the upper surface of the electrode to prevent a short circuit of the electromagnet 28.

In accordance with the patent statutes we have described and illustrated the preferred embodiment of our invention, but it will be understood that various changes and modifications can be made therein without departing from the spirit of the invention as defined by the appended claim.

We claim:

In a hydraulic brake system, comprising a metallic receptacle or master cylinder for holding an electrically conductive hydraulic brake oil for said system, an electric plug secured to said cylinder and having an insulated metallic electrode, said electrode having its lower end immersed in said liquid and electrically connected with said cylinder by said liquid, an insulated and concealed electromagnet circumscribing the upper portion of said electrode, a resilient and concealed armature mounted in said casing and having a contact at its lower face and in contacting relation with the upper face of said electrode, a circuit comprising said electrode and a source of current, electrical indicating means in said circuit, an air passage in said casing, an air vent passage in said electrode and communicating with said air passage in said casing, said air passages permitting air to pass through said casing into said cylinder, whereby when the level of said conducting liquid drops below the lower surface of said electrode, said circuit is broken, causing said electromagnet to be deenergized to permit said resilient diaphragm to move up into contacting relation with said signal circuit to produce an alarm.

DAVID SEBASTIAN.
ROBERT H. HAMPTON.
BERNT J. HEGGEN.

REFERENCES CITED

The following references are of record in the file of this patent:

UNITED STATES PATENTS

| Number | Name | Date |
|---|---|---|
| 838,823 | Thomson | Dec. 18, 1906 |
| 1,818,185 | Yull | Aug. 11, 1931 |
| 2,161,441 | Vickers | June 6, 1939 |